(12) United States Patent
Tansley (10) Patent No.: US 7,128,689 B2
(45) Date of Patent: Oct. 31, 2006

(54) GEARSHIFT MECHANISM

(75) Inventor: James R. Tansley, Derbyshire (GB)

(73) Assignee: Pro Shift Technologies Limited (GB)

( * ) Notice: Subject to any disclaimer, the term of this patent is extended or adjusted under 35 U.S.C. 154(b) by 178 days.

(21) Appl. No.: 10/490,257

(22) PCT Filed: Sep. 20, 2002

(86) PCT No.: PCT/GB02/04289

§ 371 (c)(1),
(2), (4) Date: Oct. 26, 2004

(87) PCT Pub. No.: WO03/026913

PCT Pub. Date: Apr. 3, 2003

(65) Prior Publication Data

US 2005/0043140 A1 Feb. 24, 2005

(30) Foreign Application Priority Data

Sep. 22, 2001 (GB) .................................. 0122859.2

(51) Int. Cl.
*F16H 59/74* (2006.01)
(52) U.S. Cl. ..................................................... 477/103
(58) Field of Classification Search ................ 477/103; 74/337.5, 339
See application file for complete search history.

(56) References Cited

U.S. PATENT DOCUMENTS

| 3,894,442 A | 7/1975 | Hembree |
| 4,270,414 A | 6/1981 | Tellert |
| 4,493,228 A | 1/1985 | Vukovich |
| 4,930,366 A | 6/1990 | Boucher et al. |
| 5,299,652 A | 4/1994 | Bevins |
| 6,131,682 A | 10/2000 | Walker |
| 6,257,081 B1 | 7/2001 | Gagnon |
| 6,564,663 B1 * | 5/2003 | Rioux et al. .............. 74/336 R |

FOREIGN PATENT DOCUMENTS

| EP | 0 424 883 A | 5/1991 |
| EP | 0 445 828 A | 9/1991 |
| GB | 2 345 100 A | 6/2000 |
| JP | 2001-140668 | 5/2001 |
| WO | WO 00/03912 | 1/2000 |

* cited by examiner

*Primary Examiner*—Dirk Wright
(74) *Attorney, Agent, or Firm*—Dickstein Shapiro LLP (57) ABSTRACT

A gearshift mechanism for a motorcycle (10) or other sequentially geared vehicle having a solenoid assembly (12, 14), a solenoid plunger (18), a switch apparatus (30, 32) and a linkage (22, 26). The switch apparatus (30, 32) has first and second switching positions and is operably connected to the solenoid assembly (12, 14). The linkage (22, 26) is secured to the solenoid plunger (18) and is connectable to a gearshift lever (28) of a motorcycle engine. The solenoid assembly (12) operates on actuation of the switch apparatus to its first switching position (30) causing movement of the solenoid plunger (18) in a first direction along the axis of the solenoid assembly (12, 14). The solenoid assembly (14) operates on actuation of the switch apparatus to its second switching position (32) causing movement of the solenoid plunger (18) in the opposite direction along the axis of the solenoid assembly (12, 14).

16 Claims, 4 Drawing Sheets

GEARSHIFT MECHANISM

The invention relates to a gearshift mechanism for a sequentially geared vehicle such as a motorcycle and, in particular, to a hand operable gearshift mechanism. Although the invention will be described herein in relation to a gearshift mechanism for a motorcycle, it is to be understood that the invention is also applicable to other sequentially geared vehicles such as kit cars and karts.

A pivotally mounted gearshift lever is associated with a motorcycle engine for shifting the motorcycle up and down through its gears. Pivoting the gearshift lever a predetermined distance in a clockwise or anticlockwise direction away from a rest position effects a gearshift. The direction of pivotal movement of the gearshift lever is of course dependent on whether the motorcycle is being shifted up or down a gear. On completion of the gearshift, by moving the gearshift lever the predetermined distance in the required direction, the gearshift lever is returnable to its rest position.

Conventionally the gearshift lever is linked to a foot-operated gearshift pedal. This enables a motorcyclist to effect movement of the gearshift lever, and thereby effect gearshifts, using his foot to push the pedal up or down depending on whether he wishes to shift the motorcycle up or down a gear.

Before operating the gearshift pedal, a motorcyclist must close the throttle and disengage the clutch. On completion of the gearshift, the motorcyclist re-opens the throttle and re-engages the clutch.

Operation of the gearshift lever by means of a conventional gearshift pedal of course means that a motorcyclist must be able to move his foot in order to operate the pedal. This may not be possible if the motorcyclist is disabled.

Similarly, a motorcyclist may encounter difficulties using the conventional gearshift pedal during negotiation of a tight bend. This is because a motorcyclist will lean into a tight bend to lower his centre of gravity and permit him to travel around the bend at a greater speed than may otherwise be possible in an upright position. In doing so movement of the motorcyclist's foot closest to the road surface may be limited. If the foot closest to the road surface happens to be the foot that is required to operate the gearshift pedal, it may not be possible for the motorcyclist to move his foot to operate the pedal without bringing his foot into contact with the road surface.

U.S. Pat. No. 6,131,682 is directed to an electric solenoid shifter for shifting a motorcycle upwardly through its gears by pushing a button mounted on the handlebars of the motorcycle.

The shifter employs a cable that is secured, at one end, to the gearshift pedal and, at its other end, to a solenoid plunger located within a solenoid. During operation, the solenoid moves the solenoid plunger so that it pulls on the cable and, in turn, the gearshift pedal, causing the motorcycle to shift up a gear. In addition, the shifter includes an ignition interrupter that interrupts ignition to the engine allowing a clutchless gearshift to be made during acceleration.

However, while the shifter disclosed in U.S. Pat. No. 6,131,682 permits clutchless shifting of the motorcycle up through its gears, the flexible cable does not permit shifting of the motorcycle down through its gears. The motorcyclist must operate the gearshift pedal with his foot to effect a downward gearshift.

The shifter of U.S. Pat No. 6,131,682 would not therefore be suitable for a motorcyclist who is unable to operate the gearshift pedal.

According to a first aspect of the invention there is provided a gearshift mechanism for a sequentially geared vehicle comprising:
  a solenoid assembly;
  a solenoid plunger;
  a switch apparatus, having first and second switching positions, operably connected to said solenoid assembly; and a linkage, secured to said solenoid plunger, that is connectable to a gearshift lever of the engine of a said vehicle, wherein:
  said solenoid assembly operates on actuation of said switch apparatus to its first switching position causing movement of said solenoid plunger in a first direction along the axis of said solenoid assembly; and
  said solenoid assembly operates on actuation of said switch apparatus to its second switching position causing movement of said solenoid plunger in the opposite direction along the axis of said solenoid assembly, characterised in that the gearshift mechanism further comprises a cut-out timer operably connected to said switch apparatus so that said cut-out timer temporarily prevents combustion in said vehicle engine on actuation of said switch apparatus to its first switching position, and a delay timer operably connected between said first switching position and said cut-out timer which delay timer causes activation of the cut-out timer to be delayed for a predetermined length of time after actuation of the switch apparatus. The cut-out timer may comprise an ignition cut-out timer which temporarily interrupts ignition to the vehicle engine.

Alternatively the cut-out timer comprises a fuel cut-out timer which temporarily interrupts flow of fuel to the vehicle engine. This is particularly advantageous in fuel injection vehicles.

Although the gearshift mechanism according to the first aspect of the invention is for any sequentially geared vehicle, it is particularly for use with a motorcycle.

When the gearshift mechanism of the invention is fitted to a motorcycle, movement of the solenoid plunger in response to operation of the solenoid assembly enables the gearshift mechanism to effectively replace human operation of the gearshift pedal.

Solenoid controlled movement of the gearshift lever is inherently quicker than manually controlled operation by means of a conventional gearshift pedal. The gearshift mechanism of the invention can therefore reduce the overall length of time required to effect a gearshift.

The quickness of operation of the gearshift mechanism of the invention lends itself to a racing application According to a second aspect of the invention there is provided a motorcycle having a gearshift mechanism comprising:
  a solenoid assembly;
  a solenoid plunger;
  a switch apparatus, having first and second switching positions, operably connected to said solenoid assembly; and
  a linkage, secured to said solenoid plunger, that is connectable to a gearshift lever of the engine of said motorcycle, wherein:
  said solenoid assembly operates on actuation of said switch apparatus to its first switching position causing movement of said solenoid plunger in a first direction along the axis of said solenoid assembly; and said solenoid assembly operates on actuation of said switch apparatus to its second switching position causing movement of said solenoid plunger in the opposite direction along the axis of said solenoid assembly, characterised in that the gearshift mechanism further comprises a cut-out timer operably connected to said switch apparatus so that said cut-out timer temporarily prevents combustion in said vehicle engine on actuation of said switch apparatus to its first switching position, and a delay timer operably connected between said first switching position and said cut-out timer.

Fitting of the gearshift mechanism of the invention to a motorcycle does not interfere with the conventional gearshift pedal. Movement of the gearshift lever in response to operation of the solenoid assembly will therefore cause movement of the gearshift pedal as a result of the linkage connected between the gearshift lever and the gearshift pedal. Similarly, movement of the gearshift lever in response to operation of the gearshift pedal will cause movement of the solenoid plunger along the axis of the solenoid assembly as a result of the linkage connected between the gearshift lever and the solenoid plunger.

This enables a motorcyclist to use either the conventional gearshift pedal or the gearshift mechanism of the invention to shift the motorcycle up or down a gear.

As a result, a motorcycle fitted with the gearshift mechanism of the invention may be used by a motorcyclist who is unable to operate the gearshift pedal, or by a motorcyclist who is able to use the gearshift pedal and does not wish to use the gearshift mechanism, without alteration of the motorcycle.

In another embodiment, the conventional gearshift pedal is not connected to the gearshift lever. In yet other embodiments the gearshift pedal is not present at all.

The provision of a switch apparatus to operate the solenoid assembly permits remote operation of the solenoid assembly. This means that, while the solenoid assembly is preferably mounted on the motorcycle engine or chassis to reduce the length of the linkage between the solenoid plunger and the gearshift lever, the switch apparatus may be mounted elsewhere on the motorcycle for easy access. For example, the switch apparatus may be mounted on the handlebars, thereby rendering the solenoid assembly hand-operable.

The gearshift mechanism may be fitted to a motorcycle so that actuation of the switch apparatus to the first switching position operates the gearshift lever to shift the motorcycle up a gear, and actuation of the switch apparatus to its second switching position operates the gearshift lever to shift the motorcycle down a gear.

The cut-out timer is operably connected to the switch apparatus so that the cut-out timer temporarily interrupts power to the motorcycle engine on actuation of the switch apparatus to its first switching position.

The cut-out timer permits clutchless shifting of a motorcycle up through its gears. This is because cutting the power to the motorcycle engine removes the load to the engine, thereby making it unnecessary to operate the throttle or clutch when effecting a gearshift. The provision of the the cut-out timer therefore reduces the length of time over which acceleration is lost during a gearshift because the motorcyclist may keep the throttle open during the gearshift. This has particular benefits when the gearshift mechanism of the invention is used on a racing motorcycle where upward gearshifts must be as quick as possible to achieve maximum acceleration.

The length of time for which the cut-out timer cuts the power to the engine is preferably set to the minimum amount of time to effect the gearshift so as to reduce the length of time over which acceleration is lost. Typically, the cut-out timer is set to cut the ignition for 5 to 60 ms so that acceleration is only lost for this amount of time. This is compared to 1 to 1.5 s the length of time over which acceleration is lost when the throttle is closed and the clutch is disengaged during a conventional gearshift.

In some embodiments, the cut-out timer may be set to cut power for a longer period of time such as 5 to 500 ms so that acceleration is lost for this amount of time. Such periods however remain less than the time over which acceleration is typically lost during a conventional gearshift.

In order to further enhance the gearshift operation when using the gearshift mechanism of the invention, and to ensure that power to the engine is only cut for the minimum period of time, a delay timer is operably connected between the first switching position of the switch apparatus and the cut-out timer.

A gearshift is not effected until the gearshift lever is moved a predetermined distance away from its rest position. This means that the initial movement of the gearshift lever does not effect a gearshift.

The delay timer is therefore preferably adjusted so that the cut-out timer only operates to cut power just before the gearshift lever reaches the predetermined distance away from its rest position. This further reduces the period of time during which acceleration is lost.

The length of time for which the power is cut is of course determined by the cut-out timer itself, and is preferably adjusted so that acceleration is returned as soon as the gearshift is complete. This may be before the solenoid plunger has returned the gearshift lever to its rest position.

The switch apparatus may include a single switch having first and second switching positions such as, for example, a toggle switch. However, preferably, the switch apparatus may include first and second switches, the first switch defining the first switching position, and the second switch defining the second switching position.

The provision of two separate switches enables the motorcyclist to clearly determine whether he is about to shift the motorcycle up or down a gear, and thereby reduces the risk of a motorcyclist accidentally shifting the motorcycle down a gear rather than up a gear, or vice versa.

The solenoid assembly may include a single solenoid that may be connected to the switching apparatus so that current may flow through it in either direction depending on whether the switching apparatus is switched to its first or second switching position.

In other embodiments, the solenoid assembly may include first and second axially aligned solenoids. In such embodiments the first solenoid operates on actuation of the switching apparatus to its first switching position causing movement of the solenoid plunger in the first direction along the axis of the solenoids. The second solenoid operates on actuation of the switching apparatus to its second switching position causing movement of the solenoid plunger in the opposite direction along the axis of the solenoids.

While the first and second solenoids in such embodiments may be two separate solenoids, they may, in other embodiments, be linked to form a one-piece twin solenoid.

The cut-out timer does not interrupt the power to the motorcycle engine on actuation of the switch apparatus to its second switching position. This is because shifting a motorcycle down a gear is primarily to decrease the speed of the motorcycle. It is not therefore desirable to be able to maintain the throttle open during a downward gearshift. A motorcyclist may therefore use the clutch when shifting a motorcycle down through its gears using the gearshift mechanism of the invention. Alternatively, if the motorcyclist is sufficiently skilled to use the throttle to match the load that will be applied to the engine after the gearshift, the motorcyclist may shift the motorcycle down through its gears without operating the clutch.

It is also possible to effect multiple downward gearshifts when the clutch is disengaged and the throttle is closed.

A first timer is preferably operably connected between the first switching position of the switch apparatus and the solenoid assembly and a second timer is preferably operably connected between the second switching position of the switch apparatus and the solenoid assembly. The timers control the duration of solenoid operation on actuation of the switch apparatus to either of its switching positions. The provision of such timers means that the duration of solenoid operation is not linked to the duration of actuation of the switch apparatus. The timers therefore reduce the risk of a motorcyclist damaging the solenoid assembly by actuating the switch apparatus for too long. They also reduce the risk of the motorcyclist not actuating the switch apparatus long enough to effect a gearshift.

The timers may be omitted from mechanisms intended for use on racing motorcycles. This is because the skill of a racing motorcyclist is such that he can determine the length of time required to operate the solenoid assembly and can therefore actuate the switch apparatus accordingly. Racing motorcyclists would not otherwise be able to obtain neutral unless a gearshift pedal was fitted. This is because neutral is located between first and second gears. Therefore, to obtain neutral from first gear, a motorcyclist must cause pivotal movement of the gearshift lever, in the upward gearshift direction, a distance that is not as great as the distance required to effect the upward gearshift from first gear to second gear. It is envisaged that usually a road version of a motorcycle incorporating the invention will include timers to effect timed operation of the solenoid, although this will not always be the case.

Advantageously the timers are adjustable.

The linkage connecting the gearshift plunger to the gearshift lever on the motorcycle engine preferably includes a connector rod having a threaded end and a spherical bush mounted on the threaded end.

The provision of the threaded end on the connector rod permits adjustment of the overall length of the linkage to ensure that any freeplay between the linkage and the gearshift lever is minimised.

The gearshift lever is a pivotally mounted member and so travels in an arc during a gearshift operation. This means that on motorcycles where the arc is pronounced, the gearshift lever may cause the connector rod to travel at a gradually increasing angle to the solenoid assembly axis rather than along the solenoid assembly axis. This may in turn pull the solenoid plunger into contact with the housing surrounding the solenoid assembly, or the solenoid assembly itself.

To ensure that such contact does not occur, and thereby reduce any wear or losses that may be caused by such contact, the connector rod may include a universal joint that permits articulation of the connector rod. Such articulation of the connector rod allows a certain degree of freeplay to ensure that the solenoid plunger only travels along the solenoid assembly axis. The solenoid assembly may be pivotably mountable. Other arrangements would be possible, including a loose fitting solenoid plunger and connector rod.

A preferred embodiment of the invention will now be described, by way of a non-limiting example, with reference to the accompanying drawings in which.

Figures 1, 2:
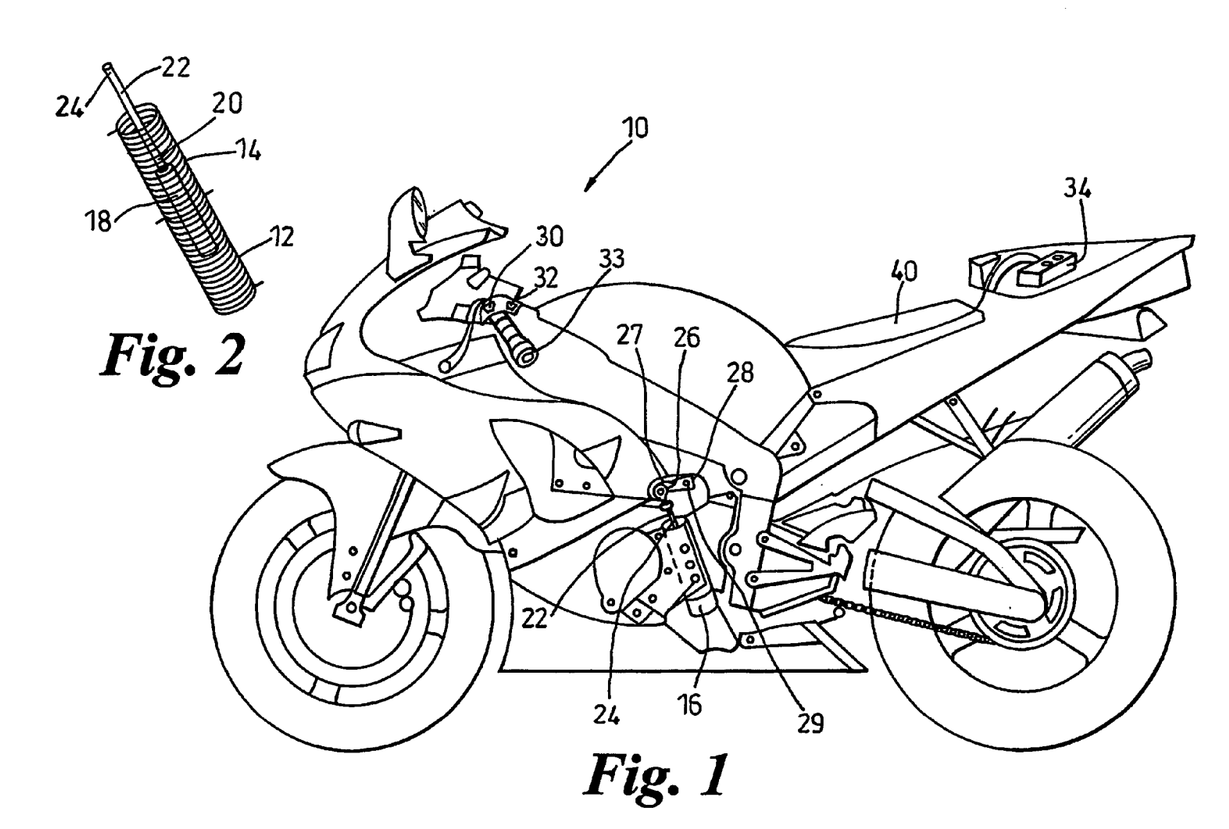
FIG. 1 shows a motorcycle incorporating a gearshift mechanism according to an embodiment of the invention.
FIG. 2 shows first and second solenoids of the gearshift mechanism of FIG. 1.

A motorcycle 10 incorporating a gearshift mechanism according to an embodiment of the invention is shown in FIG. 1.

The gearshift mechanism includes first and second axially aligned solenoids 12,14 (FIG. 2) housed within a cylindrical housing 16 mounted on the chassis of the motorcycle 10.

A solenoid plunger 18 is located within the solenoids 12,14 and is connected, at one end thereof, to the first end 20 of a connecting rod 22. The solenoid plunger 18 is made from a magnetic material.

The connecting rod 22 is threaded at its other end 24 and includes a spherical bush 26 mounted thereon. The spherical bush 26 is secured to the first end 27 of an elongate gearshift lever 28. The other end 29 of the gearshift lever is pivotally mounted on the motorcycle engine.

The length of the linkage extending between the solenoid plunger 18 and the gearshift lever 28, defined by the connector rod 22 and spherical bush 26, is adjusted to minimise freeplay between the linkage and the components 18,28 between which it is connected. Such adjustment is performed by adjusting the position of the spherical bush 26 on the threaded end 24 of the connector rod 22. The connector rod 22 is made of a non-magnetic material.

First and second switches 30,32 are mounted on the handlebars 33 of the motorcycle 10. Each of the switches 30,32 is operably connected to a respective one of the solenoids 12,14, via a control box 34 that houses first and second timers 42,44, via a wiring loom.

The first switch 30 is, in addition, operably connected to a cut-out timer comprising an ignition cut-out timer 36 (FIG. 3) connected to an ignition feed 38. It is to be understood that the cut-out timer could also comprise a fuel cut-out timer connected to a fuel injection feed, for example.

Figure 3:
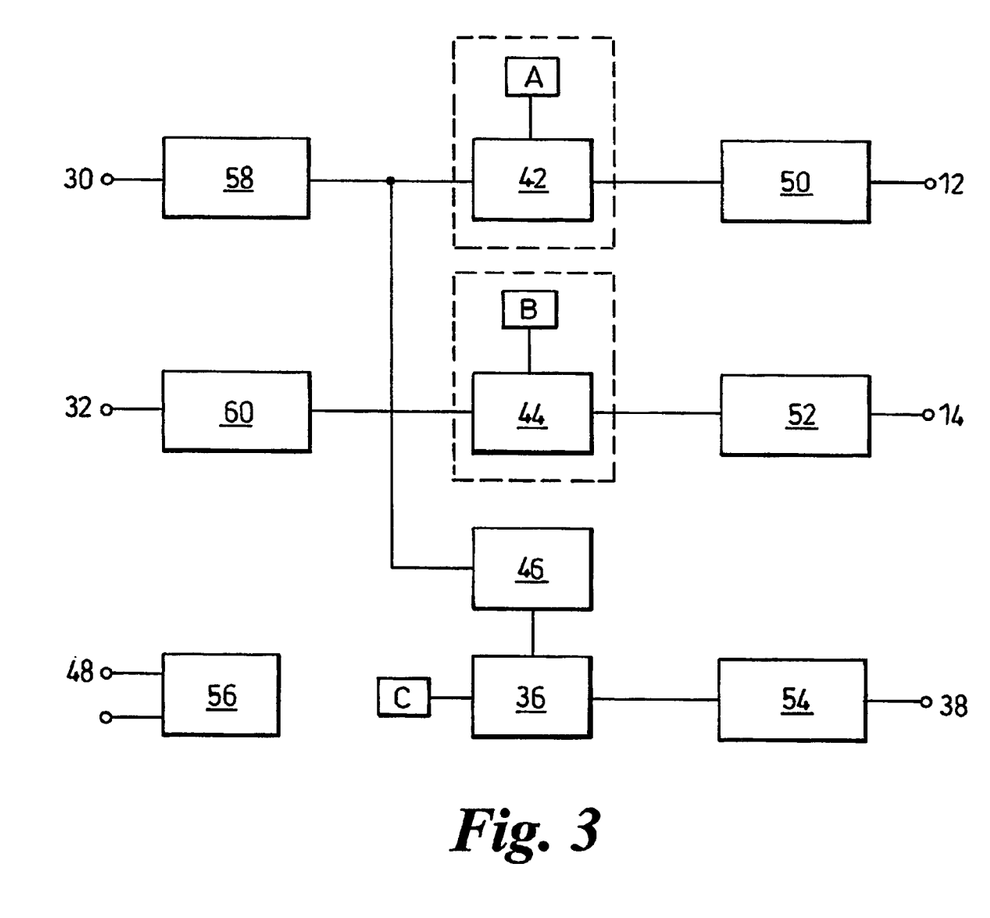
FIG. 3 shows a schematic illustration of an embodiment of the gearshift mechanism of FIG. 1.

In the embodiment shown in FIG. 1, the control box 34, via which the first and second switches 30,32 are connected to the solenoids 12,14, is located behind the seat 40 of the motorcycle 10. The control box 34 includes first and second timers 42,44 (FIG. 3). The first timer 42 is connected between the first switch 30 and the first solenoid 12. The second timer 44 is connected between the second switch 32 and the second solenoid 14.

Each of the timers 42,44 comprises a monostable circuit with a variable resistor such as a trim pot adjuster.

A series circuit containing the first switch 30, the first timer 42 and the first solenoid 12 is formed with the motorcycle battery 48 connected to control box 34 via ignition feed 38, between the first switch 30 and the first solenoid 12.

Similarly, a series circuit containing the second switch 32, the second timer 44 and the second solenoid 14 is formed with the motorcycle battery 48 connected between the second switch 32 and the second solenoid 14.

The two solenoids 12,14 face in opposite directions and therefore polarity in the first solenoid 12, is opposite to that in the second solenoid 14.

First and second power control modules (PWR) 50,52 control the power supplied to the solenoids 12,14. First and second interface modules 58,60 perform the electrical level shifting and provide the isolation that is required between the internal electronics and the outside cabling. The components are linear electronic controlling power MOSFETS.

An ignition PWR control module 54 is connected in series between the ignition feed 38 and the ignition cut-out timer 36. This component may be a single or multiple unit depending on the type of ignition used by different engines.

An internal power supply unit (PSU) 56 provides the necessary power supply for the internal electronics. All control box 34 components are either linear or logic electronics.

In order to shift the motorcycle 10 up a gear, the motorcyclist actuates the first switch 30.

On actuation of the first switch 30, the series circuit containing the first solenoid 12 is completed, causing a current to pass through the first solenoid 12. Consequently the first solenoid 12 generates an electro-magnetic field. The direction of the current passing through the first solenoid 12 is such that the polarity of the solenoid causes the solenoid plunger to move into the first solenoid 12 away from the gearshift lever 28.

Movement of the solenoid plunger 18 is transmitted via the linkage defined by the connector rod 24 and the spherical bush 26 to the gearshift lever 28, and thereby causes the gearshift lever 28 to pivot anticlockwise around the pivotally mounted end 29 thereof. Such movement of the gearshift lever 28 shifts the motorcycle 10 up a gear. In other embodiments of the invention an anticlockwise movement of the gearshift lever 28 could effect a downward gearshift.

Completion of the circuit on actuation of the first switch 30 initiates the first timer 42. The first timer 42 breaks the circuit on expiration of a predetermined period. The duration of the period is determined by the time required for the solenoid 12 to move the solenoid plunger 18 the required distance to effect the upward gearshift. An adjuster A connected to the first timer 42 may be used to alter the duration of the period.

When the first timer 42 breaks the circuit, the first solenoid 12 ceases to generate the electromagnetic field and allows the plunger 18 to move back out of the solenoid 12. This movement of the solenoid plunger 18 brings the gearshift lever 28 back to its rest position.

On actuation of the first switch 30, the pre-delay timer 46 also initiates the cut-out timer 36. On expiration of a predetermined period, the pre-delay timer 46 initiates the ignition cut-out timer 36 to operate the ignition PWR control module 54 which effects an ignition interrupt sequence and cuts ignition to the motorcycle engine for a predetermined time.

The delay set by the pre-delay timer 46, and the period of time during which the ignition cut-out timer 36 operates the ignition PWR control module 54 to cut ignition to the motorcycle engine, is set so that the period during which acceleration is lost is minimised. Adjuster C of the ignition cut-out timer 36 may be used to adjust the delay provided by the pre-delay timer 46.

While ignition to the engine is cut, the load to the motorcycle engine is removed. It is therefore possible to effect an upward gearshift with the motorcycle throttle open. This means that when ignition to the motorcycle engine is resumed, after the upward gearshift, the throttle is already open. The period during which acceleration is lost is therefore further minimised.

In order to shift the motorcycle 10 down a gear, the motorcyclist actuates the second switch 32.

On actuation of the second switch 32, the series circuit containing the second solenoid 14 is completed, causing a current to pass through the second solenoid 14. Consequently the second solenoid 14 generates an electromagnetic field. The direction of the current passing through the solenoid 14 is such that the polarity of the solenoid causes the solenoid plunger to move into the second solenoid 14 towards the gearshift lever 28.

Movement of the solenoid plunger 18 is transmitted via the linkage defined by the connector rod 22 and the spherical bush 26 to the gearshift lever 28, and thereby causes the gearshift lever 28 to pivot clockwise around the pivotally mounted end 29 thereof. Such movement of the gearshift lever 28 shifts the motorcycle 10 down a gear.

Completion of the circuit on actuation of the second switch 32 initiates the second timer 44. The second timer 44 breaks the circuit on expiration of a predetermined period. The duration of the period is determined by the time required for the solenoid 14 to move the solenoid plunger 18 the required distance to effect the downward gearshift. An adjuster B connected to the second timer 44 may be used to alter the duration of the period.

When the second timer 44 breaks the circuit, the second solenoid 14 ceases to generate the electro-magnetic field and allows the plunger 18 to move back out of the solenoid 14. This movement of the solenoid plunger 18 brings the gearshift lever 28 back to its rest position.

The ignition cut-out timer 36 does not cut the ignition to the motorcycle engine during a downward gearshift. The motorcyclist must therefore disengage the clutch during the downward gearshift or operate the throttle to match the load that will be applied to the engine after the gearshift.

Figure 4:
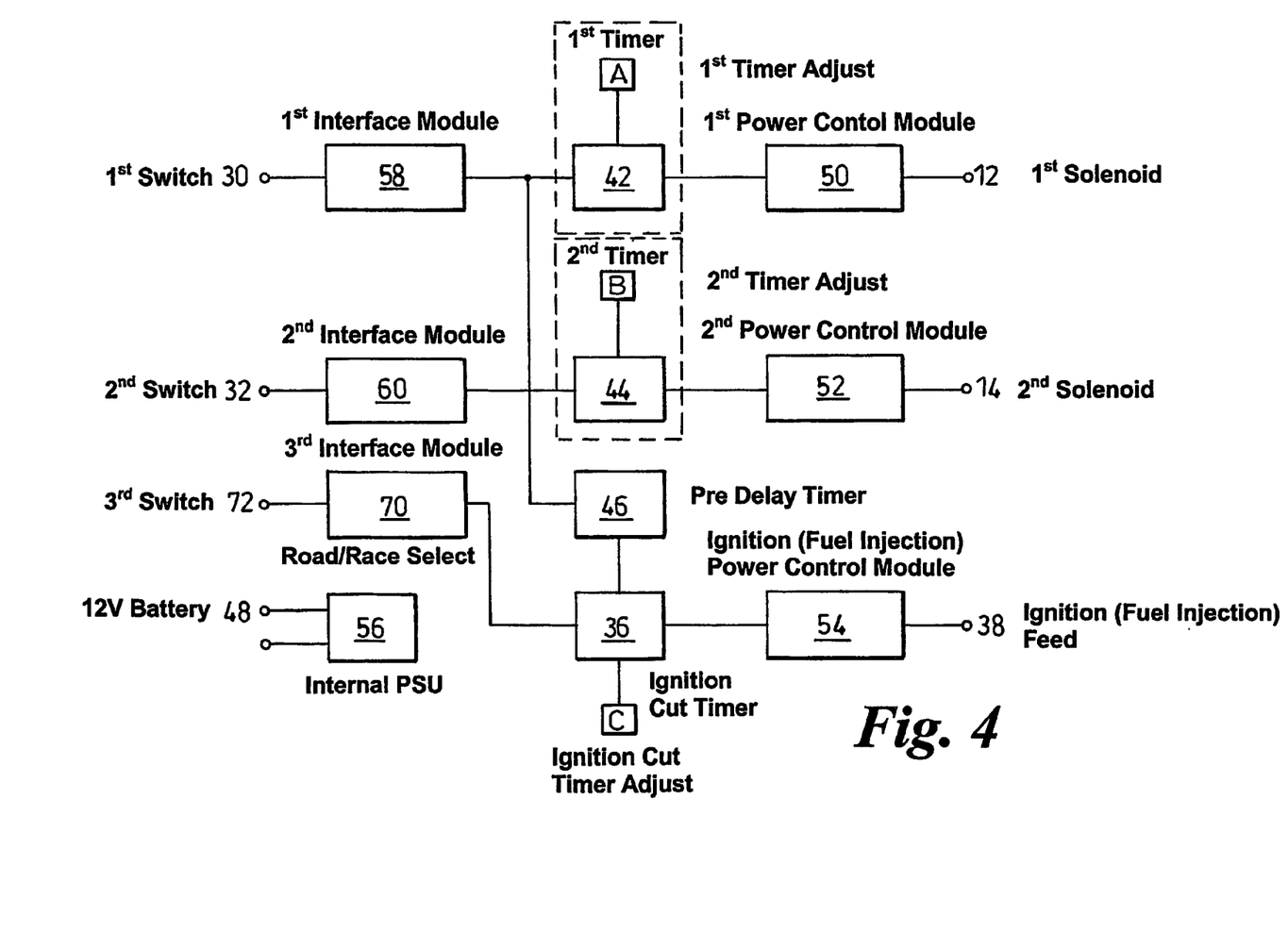
FIG. 4 is a schematic representation of a second embodiment of the gearshift of FIG. 1.
Figure 5:
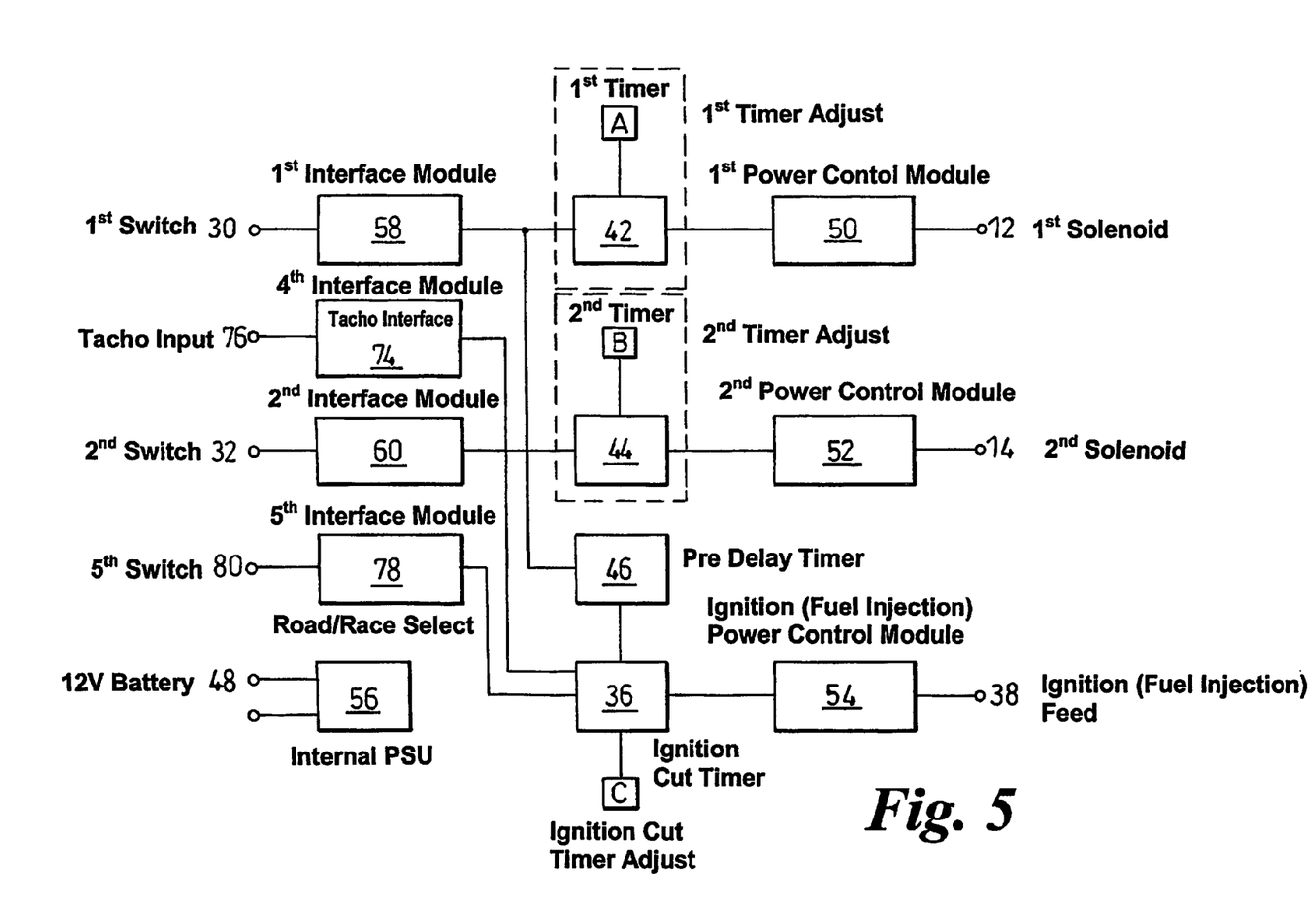
FIG. 5 is a schematic representation of a third embodiment of the gearshift of FIG. 1.

FIGS. 4 and 5 illustrate further embodiments of the gearshift mechanism that may be incorporated into a motor cycle of the type shown in FIG. 1. Components which are common to the embodiments shown in FIG. 3 and to the embodiment shown in FIGS. 4 and 5 have been given the same reference numerals for consistency.

Referring now to FIG. 4, a second embodiment of the gearshift mechanism which may be incorporated into the motor cycle of FIG. 1 is shown.

The mechanism comprises a third interface module 70 and a third switch 72. The third switch 72 allows a rider to switch between a road setting and a race setting for example. When the rider selects the road setting, the ignition cut-out timer will be set to cut ignition for a predetermined length of time. When the rider selects the race setting, the ignition cut-out timer will be set to cut the timer for a shorter period of time. This is because when a motorcycle is moving at a high speed, less time is required to change gear.

Referring to FIG. 5, a further embodiment of the gearshift mechanism is shown. In this embodiment, there is a fourth (tachometer) interface module 74 associated with tachometer input 76 and a fifth interface module 78 associated with fifth switch 80. The presence of the tachometer input which is fed into the system via the tachometer interface 74 means that the ignition cut-out timer 36 may be set in accordance with the revolutions per minute of the engine. This means that instead of the ignition cut-out timer cutting ignition to the engine for a predetermined length of time, the time that the ignition will be cut will be inversely proportional to the number of revolutions per unit time of the engine. This means that when the motorcycle is moving at a high speed, the ignition will be cut for a shorter period of time. This embodiment of the invention may be used in conjunction with a road/race selector of the type described herein above with reference to FIG. 4.

It is possible to incorporate different combinations of the features shown in the embodiments of FIGS. 4 and 5 into a gearshift mechanism according to the present invention.

In other embodiments of the invention, the first and second axially aligned solenoids 12,14 may be linked together to form a one-piece twin solenoid.

In yet other embodiments, the connector rod 22 may include a universal joint intermediate its two ends so that a first portion of the connector rod 22 may be articulated relative to a second portion. Such articulation may be used to compensate for the arc shaped path followed by the end 27 of the gearshift lever 28 during an upward or downward gearshift.

When the gearshift mechanism according to the invention is used on a racing motorcycle, the first and second timers 42,44 may be dispensed with.

In such embodiments, the period of time over which the first and second solenoids are connected to the motorcycle battery 48 is determined by the length of time the respective switches 30,32 are operated by the motorcyclist.

Connecting the solenoids 12, 14 to the battery 48 in this way enables the motorcyclist to obtain neutral. This is because neutral is located between the first and second gears of a motorcycle and is obtained, from first gear, by moving the gearshift lever, in a clockwise direction, a distance that is less than the distance required to shift the motorcycle up to second gear. This is not possible when the first timer 42 is used to control connection of the first solenoid 12 to the battery 48 and a gearshift pedal is not provided. This is because the timer 42 is set to connect the solenoid 12 to the battery 48 for a period of time that is long enough to effect the upward gearshift. The timer 42 will always therefore effect an upward gearshift to second gear, and not neutral.

The invention claimed is:

1. A gearshift mechanism for a sequentially geared vehicle comprising:
    a solenoid assembly;
    a solenoid plunger;
    a switch apparatus, having first and second switching positions, operably connected to said solenoid assembly; and
    a linkage, secured to said solenoid plunger, that is connectable to a gearshift lever of the engine of a said vehicle, wherein:
    said solenoid assembly operates on actuation of said switch apparatus to its first switching position causing movement of said solenoid plunger in a first direction along the axis of said solenoid assembly; and
    said solenoid assembly operates on actuation of said switch apparatus to its second switching position causing movement of said solenoid plunger in the opposite direction along the axis of said solenoid assembly, characterised in that the gearshift mechanism further comprises a cut-out timer operably connected to said switch apparatus so that said cut-out timer temporarily prevents combustion in said vehicle engine on actuation of said switch apparatus to its first switching position, and a delay timer operably connected between said first switching position and said power cut-out timer which delay timer causes activation of the cut-out timer to be delayed for a predetermined length of time after actuation of the switch apparatus.

2. A gearshift mechanism as claimed in claim 1 wherein the sequentially geared vehicle is a motorcycle.

3. A gearshift mechanism as claimed in claim 1 wherein said switch apparatus includes first and second switches, said first switch defining said first switching position and said second switch defining said second switching position.

4. A gearshift mechanism according to claim 1 further comprising means for adjusting the time for which the cut-out timer temporarily prevents combustion in the vehicle engine.

5. A gearshift mechanism according to claim 1 further comprising a tachometer, and means for connecting the power cutout timer to the output of the tachometer thereby varying the time for which the power cut-out timer temporarily interrupts power to the vehicle engine according to the number of revolutions per unit of time at which the engine is operating.

6. A gear shift mechanism according to claim 1 wherein the cut-out timer comprises an ignition cut-out timer.

7. An apparatus according to claim 1 wherein the cut-out timer is a fuel cut-out timer.

8. A gearshift mechanism as claimed in claim 1 wherein said solenoid assembly includes first and second axially aligned solenoids, said first solenoid operating on actuation of said switch apparatus to its first switching position causing movement of said solenoid plunger in said first direction along the axis of said solenoids, and said second solenoid operating on actuation of said switch apparatus to its second switching position causing movement of said solenoid plunger in said opposite direction along the axis of said solenoids.

9. A gearshift mechanism as claimed in claim 1 wherein said solenoid assembly includes a one-piece twin solenoid.

10. A gearshift mechanism as claimed in claim 1 wherein said cut-out timer interrupts ignition to said vehicle engine for 5 to 500 ms.

11. A gearshift mechanism as claimed in claim 10 wherein said cut-out timer interrupts ignition to said vehicle engine for 5 to 60 ms.

12. A gearshift mechanism as claimed in claim 1 or claim 10 further comprising a first timer operably connected between said first switching position and said solenoid apparatus, and a second timer operably connected between said second switching position and said solenoid apparatus.

13. A gearshift mechanism as claimed claim 1 wherein said linkage includes a connector rod having a threaded end and a spherical bush mounted on said threaded end.

14. A gearshift mechanism as claimed in claim 13 wherein said connector rod includes a universal joint that permits articulation of said connector rod.

15. A motorcycle including a gearshift mechanism as claimed in claim 1.

16. A motorcycle having a gearshift mechanism comprising:
    a solenoid assembly;
    a solenoid plunger;
    a switch apparatus, having first and second switching positions, operably connected to said solenoid assembly; and
    a linkage, secured to said solenoid plunger, that is connectable to a gearshift lever of the engine of said motorcycle, wherein:
    said solenoid assembly operates on actuation of said switch apparatus to its first switching position causing movement of said solenoid plunger in a first direction along the axis of said solenoid assembly; and said solenoid assembly operates on actuation of said switch apparatus to its second switching position causing movement of said solenoid plunger in the opposite direction along the axis of said solenoid assembly, characterised in that the gearshift mechanism further comprises a cutout timer operably connected to said switch apparatus so that said cut-out timer temporarily prevents combustion in said vehicle engine on actuation of said switch apparatus to its first switching position, and a delay timer operably connected between said first switching position and said power cut-out timer.

* * * * *